(12) United States Patent
Hou et al.

(10) Patent No.: US 8,890,724 B2
(45) Date of Patent: Nov. 18, 2014

(54) METHOD AND DEVICE FOR IDENTIFYING OR CONVERTING DATA_CODING AND METHOD AND SYSTEM FOR PROCESSING DATA_CODING

(75) Inventors: Bin Hou, Shenzhen (CN); Jun Cheng, Shenzhen (CN); Shuqiu Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 296 days.

(21) Appl. No.: 13/516,746

(22) PCT Filed: Jul. 7, 2010

(86) PCT No.: PCT/CN2010/075024
§ 371 (c)(1),
(2), (4) Date: Jun. 18, 2012

(87) PCT Pub. No.: WO2011/076000
PCT Pub. Date: Jun. 30, 2011

(65) Prior Publication Data
US 2012/0250702 A1 Oct. 4, 2012

(30) Foreign Application Priority Data
Dec. 24, 2009 (CN) .......................... 2009 1 0260080

(51) Int. Cl.
*H03M 7/34* (2006.01)
*H04L 29/08* (2006.01)
(52) U.S. Cl.
CPC .................................. *H04L 67/2823* (2013.01)
USPC .............................................. 341/51; 341/50
(58) Field of Classification Search
CPC ................................................ H04L 67/2823
USPC ...................... 375/240.16, 240.12; 341/50, 51
See application file for complete search history.

(56) References Cited

U.S. PATENT DOCUMENTS 6,362,856 B1 * 3/2002 Guzik et al. .................. 348/722
7,468,684 B2   12/2008 Chiu
(Continued)

FOREIGN PATENT DOCUMENTS

CN 1893431 A 1/2007
CN 1988694 A 6/2007
(Continued)

OTHER PUBLICATIONS

International Search Report in international application No. PCT/CN2010/075024, mailed on Nov. 4, 2010.
English Translation of the Written Opinion of the International Search Authority in international application No. PCT/CN2010/075024, mailed on Nov. 4, 2010.

*Primary Examiner* — Jean B Jeanglaude
(74) *Attorney, Agent, or Firm* — Oppedahl Patent Law Firm LLC (57) ABSTRACT

The present disclosure discloses a method and device for identifying or converting data_coding, and a method and system for processing data_coding. By finding out a source data_coding adopted by information sent by a source account in communication protocols specified in the area to which it belongs and a target data_coding accepted and adopted by a target account based on preset data_coding information of a first account group and code conversion information of a second account group, the data_coding adopted by the sent information and the data_coding desired by the target account can be accurately determined, and a code conversion error is avoided. In addition, by pre-configuring code conversion information of each account and subsequently finding out the actually adopted data_coding based on finding mechanism, not only is the finding result accurate, but also the system is convenient to be extended and flexible to be configured.

20 Claims, 7 Drawing Sheets

(56) References Cited

U.S. PATENT DOCUMENTS

| | | |
|---|---|---|
| 2004/0141554 A1* | 7/2004 | Phong et al. ............. 375/240.12 |
| 2006/0203915 A1* | 9/2006 | Wada ....................... 375/240.16 |
| 2007/0011182 A1 | 1/2007 | Chiu |
| 2007/0030904 A1* | 2/2007 | Winger et al. ............ 375/240.16 |
| 2008/0043831 A1 | 2/2008 | Bhaskaranand |

FOREIGN PATENT DOCUMENTS

| | | |
|---|---|---|
| CN | 101321280 A | 12/2008 |
| CN | 101551792 A | 10/2009 |
| CN | 101594518 A | 12/2009 |

* cited by examiner

METHOD AND DEVICE FOR IDENTIFYING OR CONVERTING DATA_CODING AND METHOD AND SYSTEM FOR PROCESSING DATA_CODING

TECHNICAL FIELD

The present disclosure relates to the field of communications, in particular to a method and device for identifying or converting data_coding and a method and system for processing data_coding.

BACKGROUND

Coding is a common technique in communications. Generally, there are multiple kinds of data_coding for communication data, such as ASCII, UNICODE, and 7BIT. A user generally communicates with other users based on a communication protocol between him and a communication operator. A communication protocol may relate to multiple kinds of data_coding for communication data; the data_coding adopted by different communication protocols may be the same or different, and the data_coding adopted in different areas may also be the same or different.

In the related art of implementing communication, generally it is necessary to convert different kinds of data_coding. The kinds of data_coding conversion generally adopted in the related art mainly include: a one-to-one fixed conversion is adopted for two specific accounts, for example, account 1 sending a message to account 2 mainly includes:

it is found that account 1 is located in area A and the value of the data_coding UNICODE used by account 1 in the communication protocol specified by area A is 10;

it is found that account 2 is located in country B, and the value of the data_coding 7BIT used by account 2 in the communication protocol specified by country B is 8; and the message of the data_coding UNICODE is converted to the message of the data_coding 7BIT.

The inventor finds that the related art at least has the following technical problems in the implementation of the present disclosure:

Although the data_coding conversion can be implemented in the related art, conversion error is easy to occur as the data_coding is only determined by the data_coding identification value included in a message, so that a user cannot use related services normally. For example, the communication protocols specified by different areas and countries are different, such as for a self-extended protocol, the identification value of UNICODE is defined to be 10 at area A, while the identification value of 7BIT is defined to be 10 at area C, therefore in the related art, the two data_coding are mistaken to be the same according to their same identification value, and the conversion between them is omitted, thereby causing an error. In addition, the one-to-one conversion results in poor extensibility, configuration flexibility, and low adaptability to the continuous development of communication technology and coding technology.

SUMMARY

The present disclosure provides a method and device for identifying or converting data_coding, and a method and system for processing data_coding, so as to solve technical problems that a data_coding is identified inaccurately and easy to be wrongly converted and system extension and configuration are not flexible.

In the present disclosure, a data_coding identifying method includes:

data_coding information of a first account group is preset;

source information sent based on a source account is received;

an area to which the source account belongs is found out from the data_coding information of the first account group according to the source account;

communication protocols specified in the area to which the source account belongs are found out from the data_coding information of the first account group according to the area to which the source account belongs; and a source data_coding adopted by the source information in the communication protocols specified in the area to which the source account belongs is found out from the data_coding information of the first account group according to the source account and the source information.

Preferably, the data_coding information of the first account group may include: an area to which each account in the first account group belongs, communication protocols specified in each area, and description information of each data_coding specified by each communication protocol; and the step of finding out the source data_coding adopted by the source information according to the source account and the source information includes:

a source communication protocol adopted by the source account in the area to which it belongs is determined according to the source account;

a communication protocol matched with the source communication protocol is found out from the communication protocols specified in the area to which the source account belongs;

a source data_coding description information matched with the data_coding description information included in the source information is found out from the description information of each data_coding specified by the matched communication protocol; and the source data_coding adopted by the source information is identified according to the source data_coding description information.

Preferably, the description information of each data_coding specified by each communication protocol may include: an identification value of each data_coding and a data_coding corresponding to the identification value of each data_coding;

the data_coding description information included in the source information is a source data_coding identification value; and the step of finding out the source data_coding description information matched with the data_coding description information included in the source information from the description information of each data_coding specified by the matched communication protocol includes: an identification value which is identical to the data_coding identification value included in the source information is found out from the identification value of each data_coding specified by the matched communication protocol; and the step of identifying the source data_coding adopted by the source information according to the source data_coding description information includes: the source data_coding adopted by the source information is determined according to the found data_coding corresponding to the identification value.

Preferably, the method may further include:

when the source data_coding adopted by the source information is not found out from the data_coding information of the first account group, the source information is processed according to the preset transmission policy.

In the present disclosure, a data_coding converting method includes:

code conversion information of a second account group is preset;

a target data_coding supported by a target account is found out from the code conversion information of the second account group according to the target account;

a conversion policy for converting a source data_coding to a target data_coding is found out from the code conversion information of the second account group, wherein the source data_coding is a data_coding adopted by source information; and the source information which is sent based on a source account, is received based on the target account; and the source information to target information adopting the target data_coding is converted according to the conversion policy.

Preferably, the code conversion information of the second account group may include: description information of the data_coding supported by each account in the second account group, each data_coding supported by a communication system to which the target account belongs, and each conversion policy for converting each data_coding to the target data_coding; and the step of finding out the conversion policy for converting the source data_coding to the target data_coding from the code conversion information of the second account group includes:

a data_coding matched with the source data_coding is found out from each data_coding supported by the communication system; and the conversion policy for converting the matched data_coding to the target data_coding is found out from each conversion policy.

Preferably, the method may further include:

when the conversion policy for converting the source data_coding to the target data_coding is not found out from the code conversion information of the second account group, the source information is processed according to a preset transmission policy.

In the present disclosure, the data_coding processing method includes: data_coding information of a first account group and code conversion information of a second account group are preset; and the method further includes:

source information which is sent based on a source account is received based on a target account;

an area to which the source account belongs is found out from the data_coding information of the first account group according to the source account;

communication protocols specified in the area to which the source account belongs are found out from the data_coding information of the first account group according to the area to which the source account belongs;

a source data_coding adopted by the source information in the communication protocols specified in the area to which the source account belongs is found out from the data_coding information of the first account group according to the source account and the source information;

a target data_coding supported by a target account is found out from the code conversion information of the second account group according to the target account;

a conversion policy for converting the source data_coding to a target data_coding is found out from the code conversion information of the second account group, wherein the source data_coding is a data_coding adopted by the source information; and the source information which is sent based on the source account is received based on the target account; and the source information is converted to target information adopting the target data_coding according to the conversion policy.

In the present disclosure, the data_coding identifying device includes: a first storing module, a first finding module, a second finding module and a third finding module, wherein the first storing module is configured to store a preset data_coding information of a first account group;

the first finding module is configured to find out an area to which a source account belongs from the data_coding information of the first account group according to the source account;

the second finding module is configured to find out communication protocols specified in the area to which the source account belongs from the data_coding information of the first account group according to the area to which the source account belongs; and the third finding module is configured to find out a source data_coding adopted by the source information in the communication protocols specified in the area to which the source account belongs from the data_coding information of the first account group according to the source account and source information.

Preferably, the data_coding information of the first account group may include: an area to which each account in the first account group belongs, communication protocols in each area, and description information of each data_coding specified by each communication protocol; and the third finding module further includes: a sub-finding module and an identifying module, wherein the sub-finding module is configured to determine a source communication protocol adopted by the source account in the area to which it belongs according to the source account; and finding out a communication protocol matched with the source communication protocol from the communication protocols specified in the area to which the source account belongs; and the identifying module is configured to find out a source data_coding description information matched with the data_coding description information included in the source information from the description information of each data_coding specified by the matched communication protocol; and identify the source data_coding adopted by the source information according to the source data_coding description information.

Preferably, the device may further include:

a first control processing module, which is configured to process the source information according to a preset transmission policy when the third finding module does not find out the source data_coding adopted by the source information from the data_coding information of the first account group.

In the present disclosure, the data_coding converting device includes a second storing module, a fourth finding module, a fifth finding module and a converting module, wherein the second storing module is configured to store preset code conversion information of a second account group;

the fourth finding module is configured to find out a target data_coding supported by a target account from the code conversion information of the second account group according to the target account;

the fifth finding module is configured to find out a conversion policy for converting a source data_coding to a target data_coding from the code conversion information of the second account group, wherein the source data_coding is a data_coding adopted by the source information, and the target account is configured to receive, based on itself, the source information which is sent based on the source account; and the converting module is configured to convert the source information to the target information adopting the target data_ coding according to the conversion policy.

Preferably, the code conversion information of the second account group may include: description information of the data_coding supported by each account in the second account group, each data_coding supported by a communication system to which the target account belongs, and each conversion policy for converting each data_coding to a target data_coding;

the fourth finding module is further configured to find out a data_coding matched with the source data_coding from each data_coding supported by the communication system; and the fifth finding module is further configured to find out the conversion policy for converting the matched data_coding to the target data_coding from each conversion policy.

Preferably, the device may further include:

a second control processing module, which is configured to process the source information according to a preset transmission policy when the fifth finding module does not find out the conversion policy for converting the source data_coding to the target data_coding from the code conversion information of the second account group.

In the present disclosure, a data_coding processing system includes: a data_coding identifying device and a data_coding converting device, wherein the data_coding identifying device includes a first storing module, a first finding module, a second finding module and a third finding module, wherein the first storing module is configured to store preset data_coding information of a first account group;

the first finding module is configured to find out an area to which a source account belongs from the data_coding information of the first account group according to the source account;

the second finding module is configured to find out communication protocols specified in the area to which the source account belongs from the data_coding information of the first account group according to the area to which the source account belongs; and the third finding module is configured to find out a source data_coding adopted by the source information in the communication protocols specified in the area to which the source account belongs from the data_coding information of the first account group according to the source account and the source information; and the data_coding converting device includes a second storing module, a fourth finding module, a fifth finding module and a converting module, wherein the second storing module is configured to store a preset code conversion information of a second account group;

the fourth finding module is configured to find out a target data_coding supported by a target account from the code conversion information of the second account group according to the target account;

the fifth finding module is configured to find out a conversion policy for converting a source data_coding to a target data_coding from the code conversion information of the second account group, wherein the source data_coding is a data_coding adopted by the source information, and the target account is configured to receive, based on itself, the source information which is sent based on the source account; and the converting module is configured to convert the source information to the target information adopting the target data_ coding according to the conversion policy.

The present disclosure has the following advantages:

The present disclosure finds out a source data_coding adopted by information sent by a source account in communication protocols specified in the area to which it belongs and a target data_coding accepted and adopted by a target account based on preset data_coding information of a first account group and code conversion information of a second account group, so as to accurately determine the data_coding adopted by the sent information and the data_coding desired by the target account, and avoid code conversion error.

In addition, by pre-configuring code conversion information of each account and subsequently finding out the actually adopted data_coding based on finding mechanism, not only is the finding result accurate, but also the system is convenient to be extended and flexible to be configured.

DETAILED DESCRIPTION

In the related art, an conversion error is difficult to be avoided in the code conversion, because a data_coding is only determined by its identification value in a source message, which results in that the determination result may not be accurate and the conversion error occurs easily.

In the present disclosure, the data_coding adopted by the information sent by a source account and the data_coding desired by a target account are accurately determined, so as to effectively avoid the conversion error.

The specific implementation of the present disclosure is described below with reference to drawings in detail.

Figure 1:
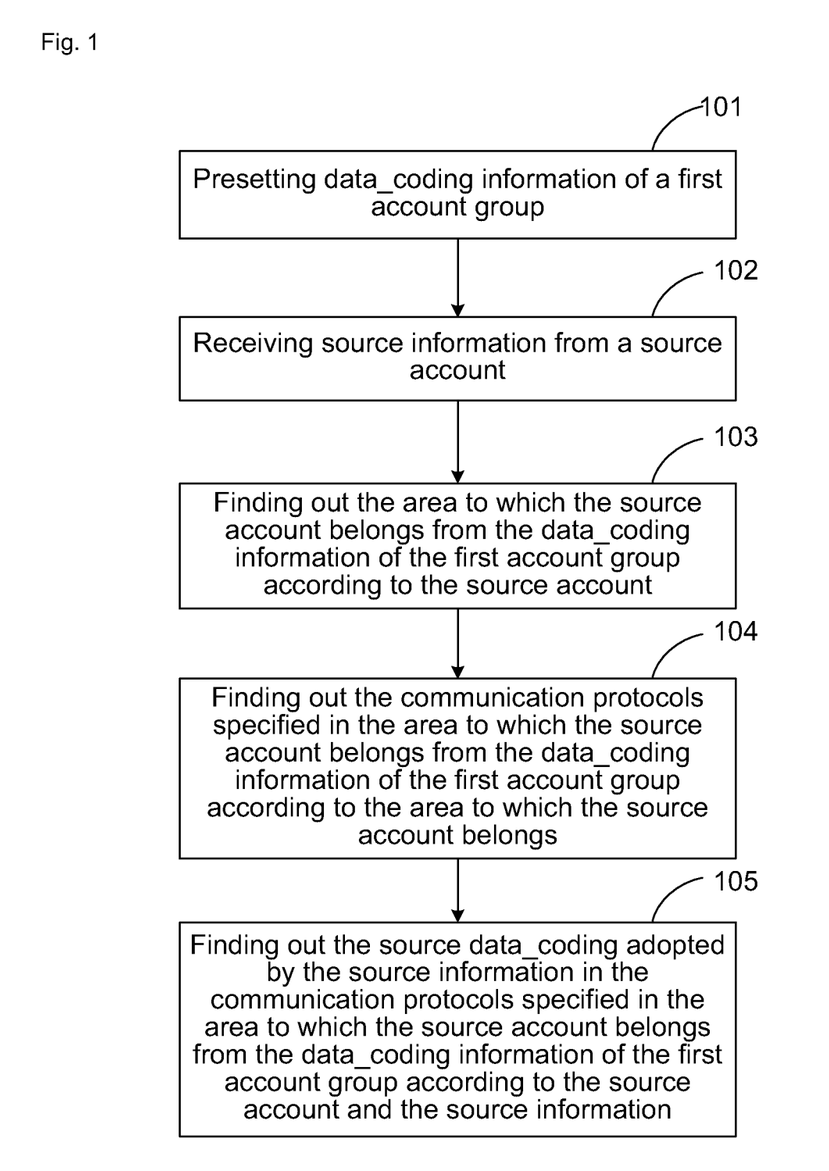
FIG. 1 is a flowchart of a data_coding identifying method in one embodiment of the present disclosure.

Referring to FIG. 1, FIG. 1 is a flowchart of a data_coding identifying method in one embodiment of the present disclosure, the flow may include the following steps:

Step 101: the data_coding information of the first account group is preset.

In the actual application of the present disclosure, the data_coding information of each account can be pre-configured according to a maximum number of the accounts the system can support. In the actual application, the data_coding information of a source account can be fount out from the data_coding information of the first account group. Specifically, the data_coding information of the first account group may include:

the area to which each account in the first account group belongs, the communication protocol in each area, and the description information of each data_coding specified by each communication protocol.

Step 102: source information sent from the source account is received.

Step 103: the area to which the source account belongs is found out from the data_coding information of the first account group according to the source account.

Step 104: the communication protocols specified in the area to which the source account belongs are found out from the data_coding information of the first account group according to the area to which the source account belongs.

Step 105: the source data_coding adopted by the source information in the communication protocols specified in the area to which the source account belongs is found out from the data_coding information of the first account group according to the source account and the source information.

In the flow shown in FIG. 1, the data_coding description information of the source account can be found out from the data_coding information of the first account group. Specifically, the communication protocol used by the source account can be determined and the area to which the source account belongs can be found out based on the source account. The source data_coding description information matched with the data_coding description information included in the source information is found out from the description of each data_coding specified by the communication protocol; if it is found out, the source data_coding adopted by the source information can be identified based on the source data_coding description information; if it is not found out, it is indicated that the data_coding adopted by the source information cannot be identified. In the actual application, the source information can be processed based on the preset transmission policy. By the transmission policy, such as a transparent transmission policy, the source information is directly sent to a target account without being processed.

In the actual application, the data_coding description information can include a data_coding identification value and a data_coding represented by the identification value; the data_coding description information included in the source information is generally the data_coding identification value, so an identification value which is identical to the data_coding identification value in the source information can be found out from the data_coding information of the first account group; and the corresponding data_coding is determined to be the source data_coding based on the identification value.

In the flow shown in FIG. 1, during the identification of the kind of data_coding adopted by the source information, not only is the data_coding description information, such as the data_coding identification value, in the source information considered, but also the area to which the source account belongs and the communication protocol used in the area is considered, so as to accurately determine the specific kind of data_coding which the source data_coding to which the data_coding identification value refers is in the communication protocol.

In addition, the data_coding information of the first account group can be preset for the subsequent finding process, so that the information of each data_coding of a specific account can be conveniently and flexibly configured at any time when the specific account accesses, which is very useful for system extension.

Figure 2:
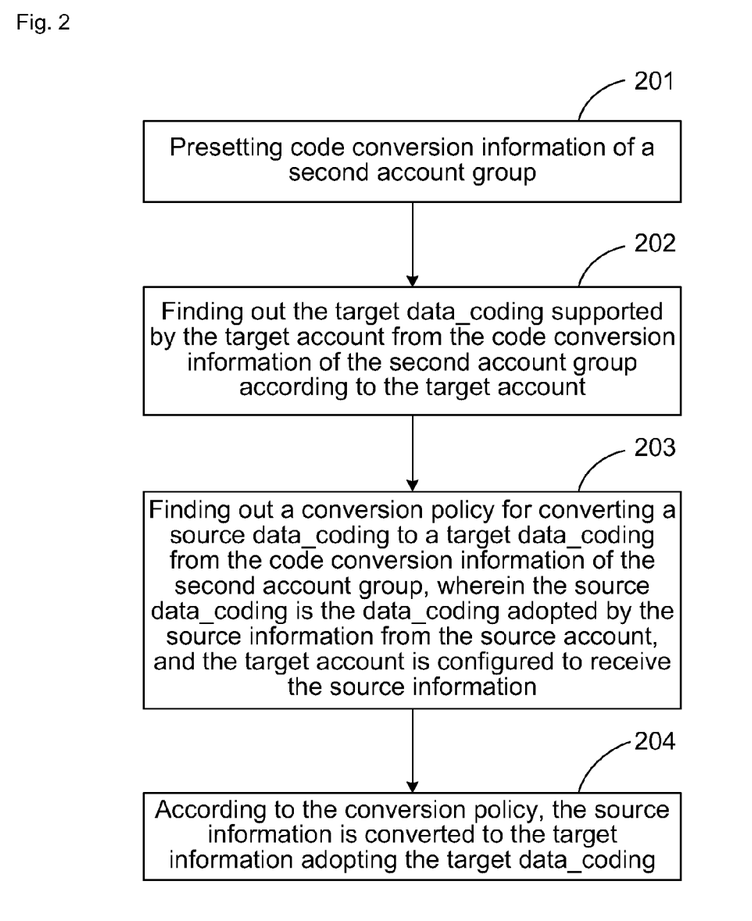
FIG. 2 is a flowchart of a data_coding converting method in one embodiment of the present disclosure.

Referring to FIG. 2, FIG. 2 is a flowchart of a data_coding converting method in one embodiment of the present disclosure, and the method may include:

Step 201: the code conversion information of the second account group is preset.

The code conversion information of the second account group may include: the description information of the data_coding supported by each account in the second account group, each data_coding supported by the communication system to which the target account belongs, and each conversion policy for converting each data_coding to a target data_coding.

Step 202: the target data_coding supported by the target account is found out from the code conversion information of the second account group according to the target account.

Step 203: a conversion policy for converting a source data_coding to a target data_coding is found out from the code conversion information of the second account group, wherein the source data_coding is the data_coding adopted by the source information from the source account and the target account is configured to receive the source information.

Specifically, the kind of data_coding matched with the source data_coding can be found out from each data_coding supported by the communication system; and the conversion policy for converting the kind of data_coding to a target data_coding can be found out from each conversion policy.

Step 204: According to the conversion policy, the source information is converted to the target information adopting the target data_coding.

In the actual application, if the conversion policy for converting the source data_coding to the target data_coding is not found out from the code conversion information of the second account group, the source information is processed according to a preset transmission policy, such as denying to receive the source information.

In the flow shown in FIG. 2, in order that the target account can read the content in source information accurately, after the information sent to the target account is received, the target data_coding and the conversion policy for converting the source data_coding to the target data_coding can be found out based on the kinds of pre-configured data_coding supported by the target account; and the data_coding and the conversion policy of the target account are accurately determined, so as to ensure the conversion accuracy.

The present disclosure further provides a data_coding processing method. In the method, the source data_coding of source information is identified by the above data_coding identifying method; and the source information is subjected to a format conversion so as to be converted to the target information in the target data_coding by the above data_coding converting method.

In the data_coding processing method, the correct conversion is ensured by accurately identifying the source data_coding of the source information, the target data_coding of the target account, and a proper conversion policy for converting a source data_coding to a target data_coding.

Figure 3:
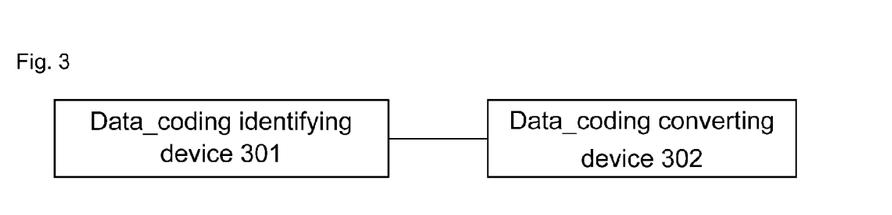
FIG. 3 is a diagram showing a structure of a data_coding processing system in one embodiment of the present disclosure.

Correspondingly, the present disclosure provides a data_coding processing system. Referring to FIG. 3, FIG. 3 is a diagram showing a structure of a data_coding processing system in one embodiment of the present disclosure, and the system may include: a data_coding identifying device 301 and a data_coding converting device 302.

Figure 4:
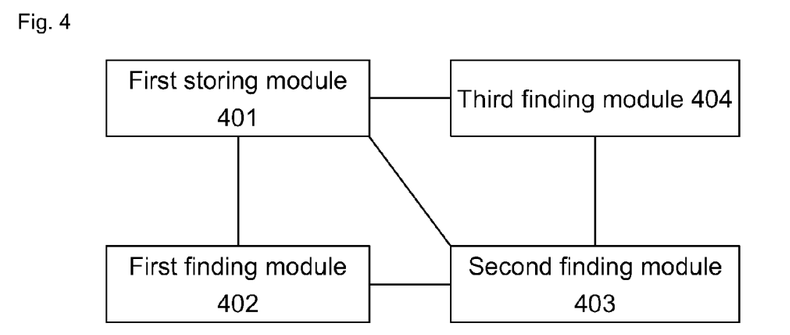
FIG. 4 is a diagram showing a structure of a data_coding identifying device 301 in one embodiment of the present disclosure.

Referring to FIG. 4, FIG. 4 is a diagram showing a structure of a data_coding identifying device 301 in one embodiment of the present disclosure, and the data_coding identifying device 301 may include: a first storing module 401, a first finding module 402, a second finding module 403, and a third finding module 404.

The first storing module 401 is configured to store the preset data_coding information of the first account group.

The first finding module 402 is configured to find out the area to which the source account belongs from the data_coding information of the first account group according to the source account.

The second finding module 403 is configured to find out the communication protocols specified in the area to which the source account belongs from the data_coding information of the first account group according to the area to which the source account belongs.

The third finding module 404 is configured to find out the source data_coding adopted by the source information in the communication protocols specified in the area to which the source account belongs from the data_coding information of the first account group according to the source account and source information sent from the source account.

Here, the third finding module 404 can include a sub-finding module and an identifying module, which are not shown in FIG. 4.

The sub-finding module is configured to determine the source communication protocol adopted by the source account in the area to which it belongs according to the source account, and for finding out a communication protocol matched with the source communication protocol from communication protocols specified in the area to which it belongs.

The identifying module is configured to find out the kind of source data_coding description information matched with the data_coding description information included in the source information from the description information of each data_coding specified by the matched communication protocol, and for identifying the source data_coding adopted by the source information from the source data_coding description information.

Figure 5:
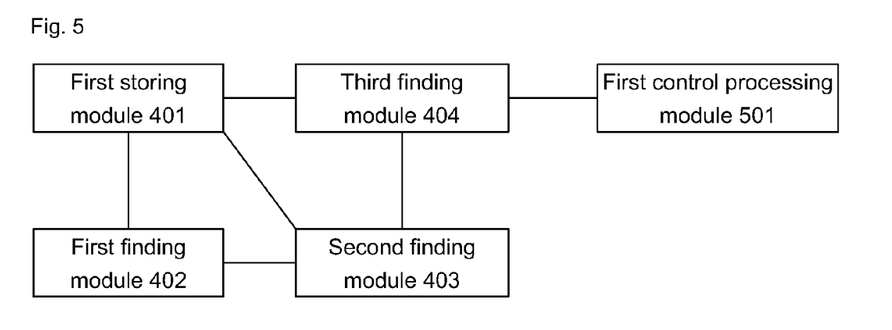
FIG. 5 is a diagram showing another structure of the data_ coding identifying device 301 in one embodiment of the present disclosure.

Referring to FIG. 5, FIG. 5 is a diagram showing another structure of the data_coding identifying device 301 in one embodiment of the present disclosure. Compared with that in FIG. 4, the data_coding identifying device 301 in FIG. 5 may further include:

a first control processing module 501 configured to process the source information according to the presetting transmission policy, for example, transmitting the source information to the target account transparently, when the third finding module does not find out the source data_coding from the data_coding information of the first account group.

Figure 6:
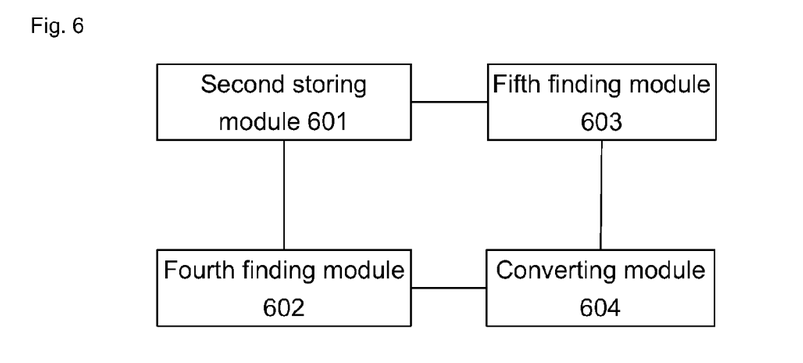
FIG. 6 is a diagram showing a structure of a data_coding converting device 302 in one embodiment of the present disclosure.

Referring to FIG. 6, FIG. 6 is a diagram showing a structure of a data_coding converting device 302 in one embodiment of the present disclosure, the data_coding converting device 302 may include: a second storing module 601, a fourth finding module 602, a fifth finding module 603 and a converting module 604.

The second storing module 601 is configured to store the preset code conversion information of the second account group.

The fourth finding module 602 is configured to find out a target data_coding supported by a target account from the code conversion information of the second account group according to the target account, and is specifically configured to find out the data_coding matched with the source data_coding from each data_coding supported by the communication system.

The fifth finding module 603 is configured to find out a conversion policy for converting a source data_coding to a target data_coding from the code conversion information of the second account group, and is specifically configured to find out the conversion policy for converting the data_coding to the target data_coding from each conversion policy.

The converting module 604 is configured to convert the source information to the target information adopting the target data_coding according to the conversion policy.

Figure 7:
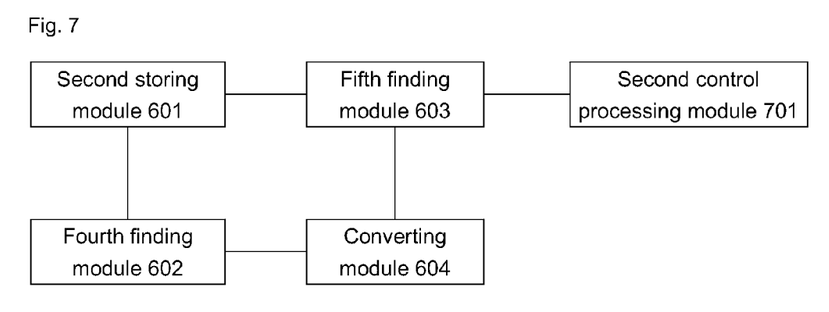
FIG. 7 is a diagram showing another structure of the data_ coding converting device 302 in one embodiment of the present disclosure.

Referring to FIG. 7, FIG. 7 is a diagram showing another structure of the data_coding converting device 302 in the embodiment of the present disclosure. Compared with that in FIG. 6, the device in FIG. 7 may further include:

a second control processing module 701 configured to process the source information according to the preset transmission policy, for example, denying the source information, when the fifth finding module 603 does not find out the conversion policy for converting the source data_coding to the target data_coding from the code conversion information of the second account group.

The data_coding identifying device 301 and the data_coding converting device 302 may be used in one system or be selected as required in the actual application.

In the specific implementation of the present disclosure, the code conversion information can be configured in the form of an index table, and the finding function is implemented through the index table.

In detail, the data_coding information of the first account group may be shown by mapping tables with three levels:

The first-level table is a mapping table recording Account IDs and areas/countries (a first-level mapping table to which accounts of a first account group belong): only one sheet of this table is needed in the whole system, the content of this table mainly includes two parts: one part is each account ID, wherein a maximum number of the accounts be supported by the system is N1; the other part is the areas to which the accounts corresponding to the account IDs belong, wherein according to the deployment of the system, the areas can be regions of one country or be different countries. A system allocates only one ID for an account for indexing. The areas to which the account IDs belong can index a corresponding table entries of the second-level table. Table 1 is shown in the following:

TABLE 1

| | Index (Account ID) | | | | |
|---|---|---|---|---|---|
| | 1 | 2 | 3 | ... | N |
| Value | China | America | Europe | ... | |

In Table 1, N is not larger than N1.

The second-level table is a mapping table recording Protocol IDs and types of communication type (a second-level mapping table to which a country or an area belongs). There are N2 sheets of the table in the whole system, wherein N2 is the number of areas/countries supported by the system. The content of the second-level table mainly includes two parts: communication protocol IDs and communication protocols corresponding to the communication protocol IDs. There are at most M2 entries in each sheet of the second-level table, wherein M2 is the largest number of protocols in a country or an area supported by the system.

For example, provided that the system supports three areas: China, America and Europe, then the second-level table has three sheets in total, and each sheet corresponds to a type of communication protocol supported in one area, as shown in Table 2 to Table 4 respectively.

TABLE 2

Sheet of second-level mapping table for China

| | Index (Protocol ID) | | | |
|---|---|---|---|---|
| | 1 | 2 | 3 | 4 |
| Value | SMPP | CMPP | SGIP | SMGP |

TABLE 3

Sheet of second-level mapping table for America

| | Index (Protocol ID) | |
|---|---|---|
| | 1 | 5 |
| Value | SMPP | SP1 |

TABLE 4

Sheet of second-level mapping table for Europe

| | Index (Protocol ID) | | |
|---|---|---|---|
| | 1 | 5 | 6 |
| Value | SMPP | SP1 | SP2 |

Table 2 shows four communication protocols used in China whose account ID supported by the system is 1: SMPP, CMPP, SGIP, and SMGP. Table 3 shows two communication protocols used in America whose account ID supported by the system is 2: SMPP, and SP1. Table 4 shows three communication protocols used in Europe whose account ID supported by the system is 3: SMPP, SP1, and SP2.

The value of each entry is a specific protocol type pointing to a certain third-level table.

The third-level table is a mapping table recording Data_coding IDs and types of data_coding (a third-level mapping table to which the protocol belongs): there are at most N3 sheets of the table in the whole system, wherein N3 is a product of the number of protocols supported by the system and the number of sheets in the second-level table, i.e., there always is an independent sheet of the three-level mapping table for each protocol in each country/area. The content of the third-level table mainly includes two parts: data_coding IDs and data_coding corresponding to the data_coding IDs, wherein the data_coding IDs can be also named as data_coding field value or data_coding identification value; and the third-level table takes each kind of protocol as an index. There are at most M3 entries in each sheet of the three-level table, and M3 is a maximum number of data_coding fields of protocols supported by the system. The value of each entry is specific protocol data_coding information which stores a specific data_coding, as shown in Table 5 to Table 8.

TABLE 5

Common sheet of third-level mapping table for SMPP, SGIP, and SMGP protocols in China

| | Index (Data_coding ID) | | |
|---|---|---|---|
| | 0 | 8 | 15 |
| Value | ASCII | UNICODE | GBK |

TABLE 6

Sheet of third-level mapping table for CMPP protocol in China

| | Index (Data_coding ID) | | | |
|---|---|---|---|---|
| | 0 | 8 | 15 | 100 |
| Value | ASCII | UNICODE | GBK | 7 BIT |

TABLE 7

Common sheet of third-level mapping table for SMPP, and SP1 protocols in America and Europe

| | Index (Data_coding ID) | | |
|---|---|---|---|
| | 0 | 8 | 15 |
| Value | ASCII | UNICODE | 7 BIT |

TABLE 8

Sheet of third-level mapping table for SP2 protocol in Europe

| | Index (Data_coding ID) | | |
|---|---|---|---|
| | 0 | 100 | 150 |
| Value | ASCII | UNICODE | 8 BIT |

The kinds of data_coding to which Table 5 to Table 8 refer include: ASCII, UNICODE, GBK, 7BIT, and 8BIT. It should be noted that the data_coding ID 15 identifies a GBK data_coding in Tables 5 and 6, while the data_coding ID 15 identifies a 7BIT data_coding in Table 7. In the related art, it is difficult to identify the above data_coding between GBK and 7BIT, while with the technical solution of the present disclosure, the kinds of data_coding with the same data_coding ID can be accurately identified to be different according to the first-level table and the second-level table.

In the actual application, during system startup and initialization, according to the maximum number of protocols supported by the system, a corresponding three-level mapping table is created. When an account is added, it is only necessary to select the area to which the account belongs and fill it in the corresponding entry in the first-level mapping table. The system automatically fills the protocol type to the corresponding entry in the second-level mapping table to which it belongs according to the account type. The value in each entry of the third-level mapping table can be initialized according to the kinds of data_coding supported by the system during the creation of the third-level mapping table or dynamically updated during the manual configuration for the account. The three-level mapping table is preferable as it can reflect the advantages of the present disclosure, such as high expansibility and flexible configuration.

In the actual application, when the system receives the information, such as a message, from a source account, the corresponding information in the second-level mapping table is acquired from the first-level mapping table according to the account ID, then the corresponding information in the third-level mapping table is acquired from the second-level mapping table according to the area to which the account belongs, and finally, the corresponding data_coding type is acquired according to the data_coding field included in the message.

The conversion processing can be implemented in a two-level mapping table:

The first-level table may be a mapping table recording Account IDs and kinds of data_coding (a first-level mapping table to which the accounts of the second account group belong): the table shows the code conversion information of the second account group; the whole system only needs one sheet of this table; the content of the table mainly includes two parts: the first part is each account ID, wherein a maximum number of the accounts be supported by the system is A1, and A1 can be the same as or different from N1; the second part is the data_coding desired by each account ID. In the actual application, one account can be provided with multiple kinds of desired data_coding according to priority. The information of the second part points to a specific second-level table, as shown in Table 9 below:

TABLE 9

| | | Index (Account ID) | | | |
|---|---|---|---|---|---|
| | 1 | 2 | 2 | 3 | ... M |
| Value | UNICODE | ASCII (Priority 1) | 8 BIT (Priority 2) | 7 BIT | ... ASCII |

In Table 9, M is not larger than A1.

The system defines data_coding ID, as shown in Table 10 below:

TABLE 10

| Data_coding ID table predefined in system | | | | | |
|---|---|---|---|---|---|
| | Data_coding ID | | | | |
| | 1 | 2 | 3 | 4 | 5 |
| Value | ASCII | UNICODE | GBK | 7 BIT | 8 BIT |

The second-level table is a mapping table recording conversion relationship between kinds of data_coding (a second-level mapping table to which a data_coding belongs): the table can reflect the permission mechanism supported by the conversion. There are A2 sheets of the table in the whole system, wherein A2 is the number of the data_coding types supported by the system, i.e., each convertible code has such an independent second-level mapping table. The table takes the data_coding ID in Table 10 as an index. Therefore, there are at most B1 entries in each sheet of the second-level table, wherein B1 is the number of the convertible code types supported by the system. Value of each entry is a specific data_coding, as shown in Table 11 to Table 15 below:

TABLE 11

Second-level mapping table in UNICODE data_coding

| Index (data_coding ID) | Value |
|---|---|
| 1 | ASCII_TO_UNICODE |
| 2 | No conversion is needed |
| 3 | GBK_TO_UNICODE |
| 4 | 7 BIT_TO_UNICODE |
| 5 | 8 BIT_TO_UNICODE |

TABLE 12

Second-level mapping table in 7 BIT data_coding

| Index (data_coding ID) | Value |
|---|---|
| 1 | ASCII_TO_7 BIT |
| 2 | UNICODE_TO_7 BIT |
| 3 | Unsupported |
| 4 | No conversion is needed |
| 5 | 8 BIT_TO_7 BIT |

TABLE 13

Second-level mapping table in ASCII data_coding

| Index (data_coding ID) | Value |
|---|---|
| 1 | No conversion is needed |
| 2 | UNICODE_TO_ASCII |
| 3 | GBK_TO_ASCII |
| 4 | 7 BIT_TO_ASCII |
| 5 | 8 BIT_TO_ASCII |

TABLE 14

Second-level mapping table in GBK data_coding

| Index (data_coding ID) | Value |
|---|---|
| 1 | ASCII_TO_GBK |
| 2 | UNICODE_TO_GBK |
| 3 | No conversion is needed |
| 4 | 7 BIT_TO_GBK |
| 5 | 8 BIT_TO_GBK |

TABLE 15

Second-level mapping table in 8 BIT data_coding

| Index (data_coding ID) | Value |
|---|---|
| 1 | ASCII_TO_8 BIT |
| 2 | UNICODE_TO_8 BIT |
| 3 | Unsupported |
| 4 | 7 BIT_TO_8 BIT |
| 5 | No conversion is needed |

In the actual application, during system startup and initialization, according to the maximum number of protocols supported by the system, a corresponding two-level mapping table is created. When an account is added, a data_coding that the account desires to adopt or supports is selected and filled in a corresponding entry in the first-level. The system automatically fills it to the corresponding entry in the second-level table to which the data_coding belongs according to the code conversion information supported thereby. During the selection of the data_coding that the account desires to adopt or supports, multiple kinds of data_coding can be selected in turn according to the priority.

When preparing to forward a source message to a target account, the system acquires the target data_coding from the first-level account mapping table automatically converted according to the target account ID, then with the acquired source data_coding automatically identified to be an index, the system acquires a corresponding coding conversion function for conversion from the second-level mapping table to which the data_coding belongs. If multiple kinds of target conversion data_coding have been configured, the code conversion process is performed according to the priority. When the automatic identification of the data_coding is failed, a corresponding transparent processing is performed by determining whether account configuration allows the transparent transmission.

Figure 8:
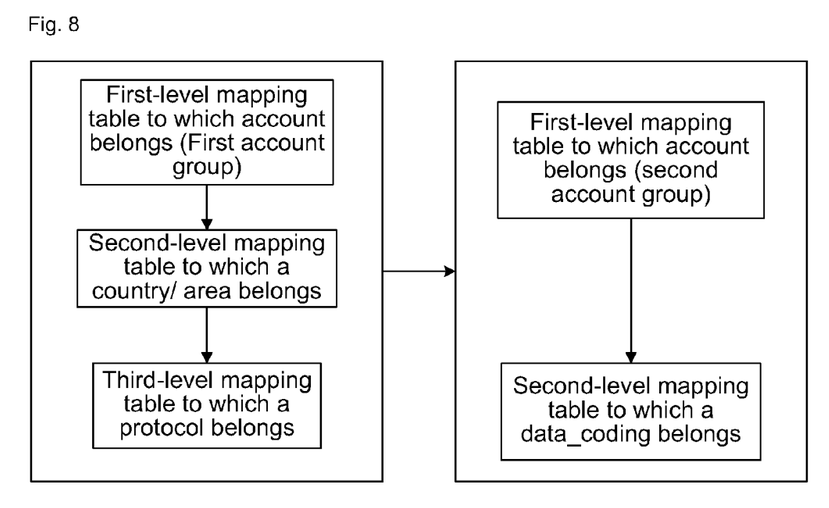
FIG. 8 is a diagram showing a mapping table in one embodiment of the present disclosure.

Referring to FIG. 8, FIG. 8 is a diagram showing a mapping table in one embodiment of the present disclosure. With the implementation of the present disclosure, it is very easy to implement code conversion extension by only extending the size of each sheet of the corresponding mapping table. It is only necessary to dynamically modify specific values in each sheet to realize high configuration flexibility. Due to the countries/areas mapping table is added, the problem of inconsistent specification in different countries/areas can also be solved.

Figure 9:
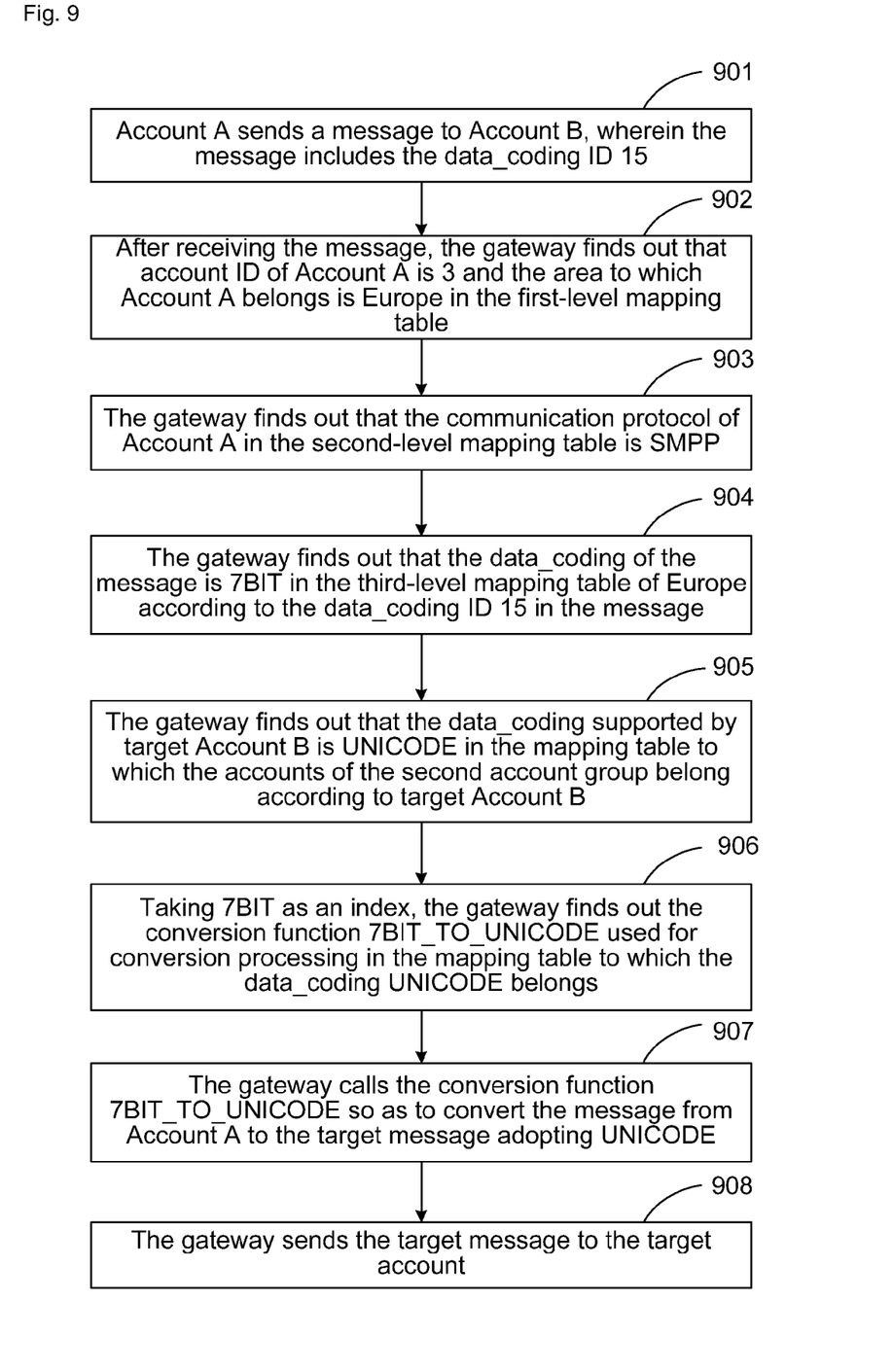
FIG. 9 is a flowchart of a data_coding conversion in one embodiment of the present disclosure.

Referring to FIG. 9, FIG. 9 is a flowchart of a data_coding conversion in one embodiment of the present disclosure, the conversion includes:

Step 901: Account A sends a message to Account B, wherein the message includes the data_coding ID 15.

Step 902: After receiving the message, the gateway finds out that account ID of Account A is 3 and the area to which Account A belongs is Europe in the first-level mapping table.

Step 903: The gateway finds out that the communication protocol of Account A in the second-level mapping table is SMPP.

Step 904: The gateway finds out that the data_coding of the message is 7BIT in the third-level mapping table of Europe according to the data_coding ID 15 in the message.

Step 905: The gateway finds out that the data_coding supported by target Account B is UNICODE in the mapping table to which the accounts of the second account group belong according to target Account B.

Step 906: Taking 7BIT as an index, the gateway finds out the conversion function 7BIT_TO_UNICODE used for conversion processing in the mapping table to which the data_coding UNICODE belongs.

Step 907: The gateway calls the conversion function 7BIT_TO_UNICODE so as to convert the message from Account A to the target message adopting the UNICODE.

Step 908: The gateway sends the target message to the target account.

In the embodiment shown in FIG. 9, based on the each level of mapping table, the accurate identification of data_coding of a source message and a target data_coding is implemented so as to implement correct process of the data_coding conversion and the communication among users, and as a result, it may improve user experience.

Figure 10:
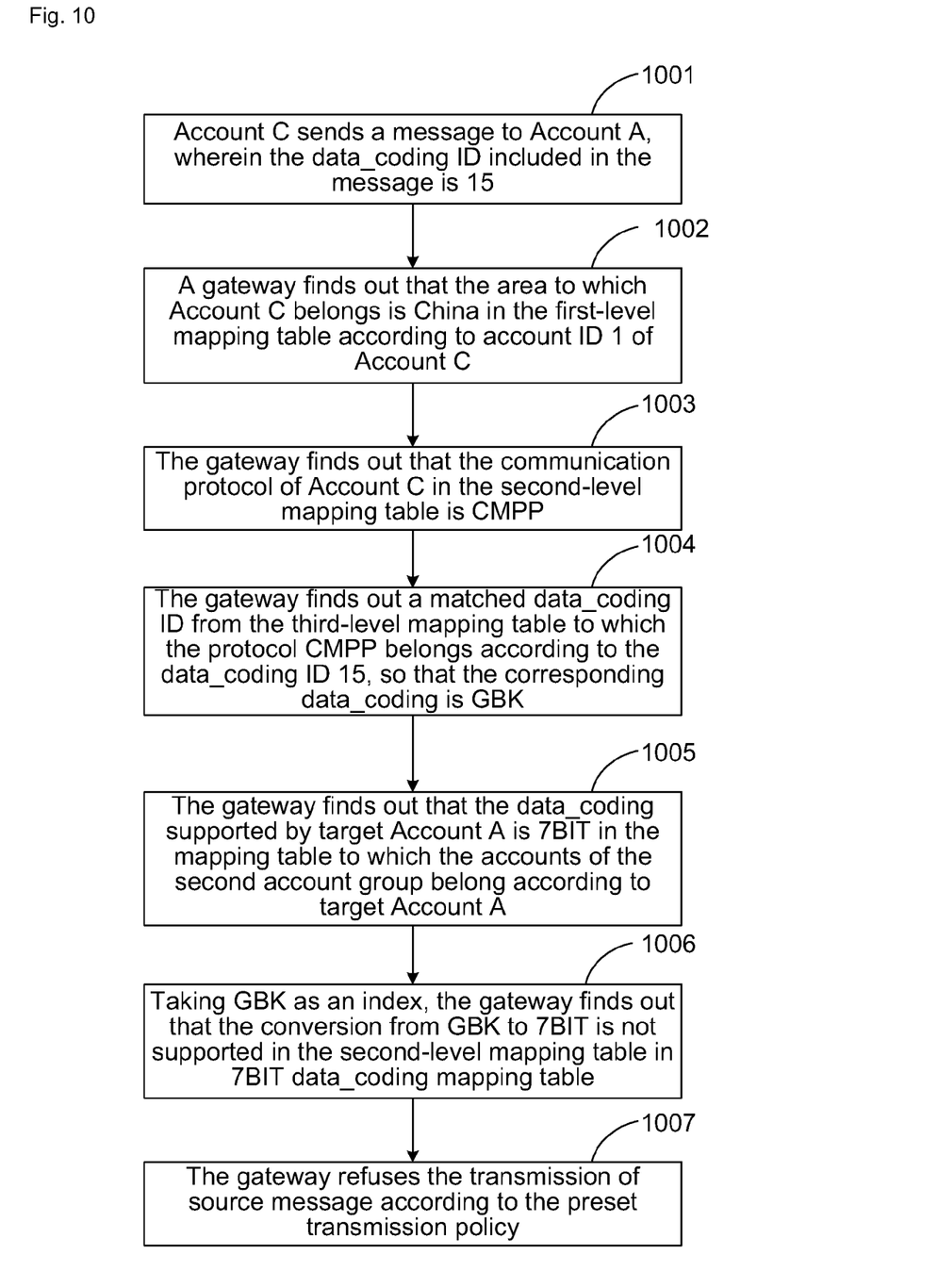
FIG. 10 is a flowchart of a failed data_coding conversion in one embodiment of the present disclosure.

Referring to FIG. 10, FIG. 10 is a flowchart of a failed data_coding conversion in one embodiment of the present disclosure, and the conversion includes:

Step 1001: Account C sends a message to Account A, wherein the data_coding ID included in the message is 15.

Step 1002: A gateway finds out that the area to which Account C belongs is China in the first-level mapping table according to account ID 1 of Account C.

Step 1003: The gateway finds out that the communication protocol of Account C in the second-level mapping table is CMPP.

Step 1004: The gateway finds out a matched data_coding ID from the third-level mapping table to which the protocol CMPP belongs according to the data_coding ID 15, so that the corresponding data_coding is GBK.

Step 1005: The gateway finds out that the data_coding supported by target Account A is 7BIT in the mapping table to which the accounts of the second account group belong according to target Account A.

Step 1006: Taking GBK as an index, the gateway finds out that the conversion from GBK to 7BIT is not supported in the second-level mapping table in 7BIT data_coding mapping table.

Step 1007: The gateway refuses the transmission of source message according to the preset transmission policy.

The flow shown in FIG. 10 is an embodiment for processing special circumstances.

Figure 11:
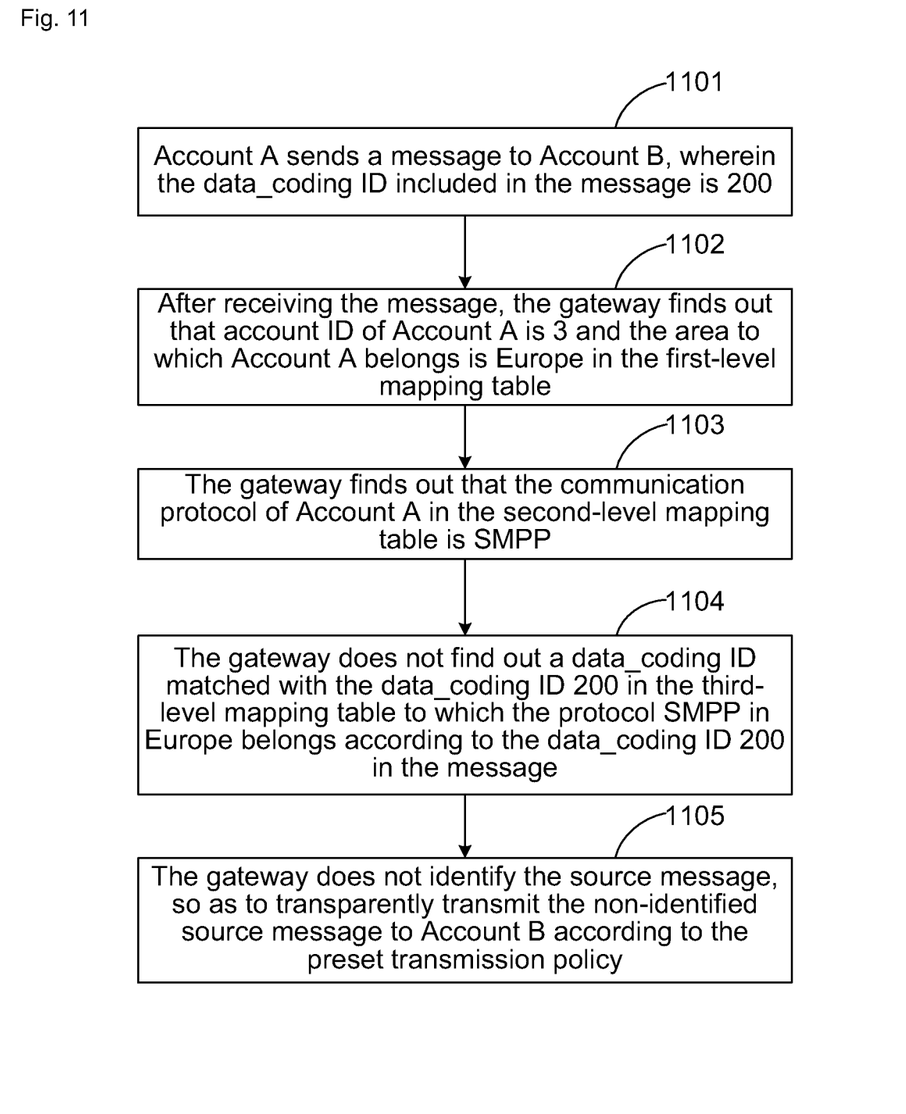
FIG. 11 is a flowchart of a failed identification for source information data_coding in one embodiment of the present disclosure.

Referring to FIG. 11, FIG. 11 is a flowchart of a failed identification for source information data_coding in one embodiment of the present disclosure, the failed identification includes:

Step 1101: Account A sends a message to Account B, wherein the data_coding ID included in the message is 200.

Step 1102: After receiving the message, the gateway finds out that account ID of Account A is 3 and the area to which Account A belongs is Europe in the first-level mapping table.

Step 1103: The gateway finds out that the communication protocol of Account A in the second-level mapping table is SMPP.

Step 1104: The gateway does not find out a data_coding ID matched with the data_coding ID 200 in the third-level mapping table to which the protocol SMPP in Europe belongs according to the data_coding ID 200 in the message.

Step 1105: The gateway does not identify the source message, so as to transparently transmit the non-identified source message to Account B according to the preset transmission policy.

To sum up, due to the implementation of the present disclosure, not only can the coding conversion be correctly processed and the system configuration and extension be convenient, but also various circumstances in the actual communication can be correctly handled.

Obviously, any modifications and variations of the present disclosure can be made by those skilled in the art within the spirit and scope of the present disclosure. In this way, if such modifications and variations of the present disclosure are in the scope of the claims and its equivalents, the present disclosure is intended to embrace such modifications and variations.

The invention claimed is:

1. A data_coding identifying method, comprising:
presetting data_coding information of a first account group;
receiving source information sent based on a source account;
finding out an area to which the source account belongs from the data_coding information of the first account group according to the source account;
finding out communication protocols specified in the area to which the source account belongs from the data_coding information of the first account group according to the area to which the source account belongs; and finding out a source data_coding adopted by the source information in the communication protocols specified in the area to which the source account belongs from the data_coding information of the first account group according to the source account and the source information.

2. The method according to claim 1, wherein the data_coding information of the first account group comprises: an area to which each account in the first account group belongs, communication protocols specified in each area, and description information of each data_coding specified by each communication protocol; and the step of finding out the source data_coding adopted by the source information according to the source account and the source information comprises:

determining a source communication protocol adopted by the source account in the area to which it belongs according to the source account;

finding out a communication protocol matched with the source communication protocol from the communication protocols specified in the area to which the source account belongs;

finding out a source data_coding description information matched with the data_coding description information included in the source information from the description information of each data_coding specified by the matched communication protocol; and identifying the source data_coding adopted by the source information according to the source data_coding description information.

3. The method according to claim 2, wherein the description information of each data_coding specified by each communication protocol comprises: an identification value of each data_coding and a data_coding corresponding to the identification value of each data_coding; and the data_coding description information included in the source information is a source data_coding identification value; and the step of finding out the source data_coding description information matched with the data_coding description information included in the source information from the description information of each data_coding specified by the matched communication protocol comprises: finding out an identification value which is identical to the data_coding identification value included in the source information from the identification value of each data_coding specified by the matched communication protocol; and the step of identifying the source data_coding adopted by the source information according to the source data_coding description information comprises: determining the source data_coding adopted by the source information according to the found data_coding corresponding to the identification value.

4. The method according to claim 1, further comprising:
processing the source information according to a preset transmission policy when the source data_coding adopted by the source information is not found out from the data_coding information of the first account group.

5. A data_coding converting method, comprising:
presetting code conversion information of a account group;
finding out a target data_coding supported by a target account from the code conversion information of the account group according to the target account;
finding out a conversion policy for converting a source data_coding to a target data_coding from the code conversion information of the account group, wherein the source data_coding is a data_coding adopted by source information; and receiving, based on the target account, the source information which is sent based on a source account; and converting the source information to target information adopting the target data_coding according to the conversion policy.

6. The method according to claim 5, wherein the code conversion information of the account group comprises: description information of the data_coding supported by each account in the account group, each data_coding supported by a communication system to which the target account belongs, and each conversion policy for converting each data_coding to the target data_coding; and the step of finding out the conversion policy for converting the source data_coding to the target data_coding from the code conversion information of the account group comprises:

finding out a data_coding matched with the source data_coding from each data_coding supported by the communication system; and finding out the conversion policy for converting the matched data_coding to the target data_coding from each conversion policy.

7. The method according to claim 5, further comprising:
processing the source information according to a preset transmission policy when the conversion policy for converting the source data_coding to the target data_coding is not found out from the code conversion information of the account group.

8. A data_coding processing method, comprising: presetting data_coding information of a first account group and code conversion information of a second account group; and further comprising:

receiving, based on a target account, source information which is sent based on a source account;

finding out an area to which the source account belongs from the data_coding information of the first account group according to the source account;

finding out communication protocols specified in the area to which the source account belongs from the data_coding information of the first account group according to the area to which the source account belongs;

finding out a source data_coding adopted by the source information in the communication protocols specified in the area to which the source account belongs from the data_coding information of the first account group according to the source account and the source information;

finding out a target data_coding supported by a target account from the code conversion information of the second account group according to the target account;

finding out a conversion policy for converting the source data_coding to a target data_coding from the code conversion information of the second account group, wherein the source data_coding is a data_coding adopted by the source information; and receiving, based on the target account, the source information which is sent based on the source account; and converting the source information to target information adopting the target data_coding according to the conversion policy.

9. A data_coding identifying device, comprising: a first storing module, a first finding module, a second finding module and a third finding module, wherein the first storing module is configured to store preset data_coding information of a first account group;

the first finding module is configured to find out an area to which a source account belongs from the data_coding information of the first account group according to the source account;

the second finding module is configured to find out communication protocols specified in the area to which the source account belongs from the data_coding information of the first account group according to the area to which the source account belongs; and the third finding module is configured to find out a source data_coding adopted by the source information in the communication protocols specified in the area to which the source account belongs from the data_coding information of the first account group according to the source account and source information.

10. The device according to claim 9, wherein the data_coding information of the first account group comprises: an area to which each account in the first account group belongs, communication protocols in each area, and description information of each data_coding specified by each communication protocol;

the third finding module further comprises: a sub-finding module and an identifying module; wherein the sub-finding module is configured to determine a source communication protocol adopted by the source account in the area to which it belongs according to the source account; and find out a communication protocol matched with the source communication protocol from the communication protocols specified in the area to which the source account belongs; and the identifying module is configured to find out a source data_coding description information matched with the data_coding description information included in the source information from the description information of each data_coding specified by the matched communication protocol; and identify the source data_coding adopted by the source information according to the source data_coding description information.

11. The device according to claim 9, further comprising:

a first control processing module, which is configured to process the source information according to a preset transmission policy when the third finding module does not find out the source data_coding adopted by the source information from the data_coding information of the first account group.

12. A data_coding converting device, comprising: a storing module, a fist finding module, a second finding module and a converting module, wherein the storing module is configured to store preset code conversion information of a account group;

the first finding module is configured to find out a target data_coding supported by a target account from the code conversion information of the account group according to the target account;

the second finding module is configured to find out a conversion policy for converting a source data_coding to a target data_coding from the code conversion information of the account group, wherein the source data_coding is a data_coding adopted by the source information, the target account is configured to receive, based on itself, the source information which is sent based on the source account; and the converting module is configured to convert the source information to the target information adopting the target data_coding according to the conversion policy.

13. The device according to claim 12, wherein the code conversion information of the account group comprises: description information of the data_coding supported by each account in the account group, each data_coding supported by a communication system to which the target account belongs, and each conversion policy for converting each data_coding to a target data_coding;

the first finding module is further configured to find out a data_coding matched with the source data_coding from each data_coding supported by the communication system; and the second finding module is further configured to find out the conversion policy for converting the matched data_coding to the target data_coding from each conversion policy.

14. The device according to claim 12, further comprising:

a control processing module, which is configured to process the source information according to a preset transmission policy when the second finding module does not find out the conversion policy for converting the source data_coding to the target data_coding from the code conversion information of the account group.

15. A data_coding processing system, comprising: a data_coding identifying device and a data_coding converting device, wherein the data_coding identifying device comprises a first storing module, a first finding module, a second finding module and a third finding module; wherein the first storing module is configured to store preset data_coding information of a first account group;

the first finding module is configured to find out an area to which a source account belongs from the data_coding information of the first account group according to the source account;

the second finding module is configured to find out communication protocols specified in the area to which the source account belongs from the data_coding information of the first account group according to the area to which the source account belongs;

the third finding module is configured to find out a source data_coding adopted by the source information in the communication protocols specified in the area to which the source account belongs from the data_coding information of the first account group according to the source account and the source information;

the data_coding converting device comprises a second storing module, a fourth finding module, a fifth finding module and a converting module, wherein the second storing module is configured to store preset code conversion information of a second account group;

the fourth finding module is configured to find out a target data_coding supported by a target account from the code conversion information of the second account group according to the target account;

the fifth finding module is configured to find out a conversion policy for converting a source data_coding to a target data_coding from the code conversion information of the second account group, wherein the source data_coding is a data_coding adopted by the source information, and the target account is configured to receive, based on itself, the source information which is sent based on the source account; and the converting module is configured to convert the source information to the target information adopting the target data_coding according to the conversion policy.

16. The method according to claim 2, further comprising:

processing the source information according to a preset transmission policy when the source data_coding adopted by the source information is not found out from the data_coding information of the first account group.

17. The method according to claim 3, further comprising: processing the source information according to a preset transmission policy when the source data_coding adopted by the source information is not found out from the data_coding information of the first account group.

18. The method according to claim 6, further comprising: processing the source information according to a preset transmission policy when the conversion policy for converting the source data_coding to the target data_coding is not found out from the code conversion information of the account group.

19. The device according to claim 10, further comprising: a first control processing module, which is configured to process the source information according to a preset transmission policy when the third finding module does not find out the source data_coding adopted by the source information from the data_coding information of the first account group.

20. The device according to claim 13, further comprising: a control processing module, which is configured to process the source information according to a preset transmission policy when the second finding module does not find out the conversion policy for converting the source data_coding to the target data_coding from the code conversion information of the account group.

* * * * *